Feb. 16, 1960 W. W. PHARIS 2,925,472

INTERCEPT CIRCUIT FOR TAPE ANNOUNCER

Filed July 19, 1957 3 Sheets-Sheet 1

INVENTOR.
WILLIAM W. PHARIS
BY George J. Seligsohn
ATTORNEY

Feb. 16, 1960 W. W. PHARIS 2,925,472

INTERCEPT CIRCUIT FOR TAPE ANNOUNCER

Filed July 19, 1957 3 Sheets-Sheet 2

Feb. 16, 1960 W. W. PHARIS 2,925,472

INTERCEPT CIRCUIT FOR TAPE ANNOUNCER

Filed July 19, 1957 3 Sheets-Sheet 3

United States Patent Office 2,925,472

Patented Feb. 16, 1960

2,925,472

INTERCEPT CIRCUIT FOR TAPE ANNOUNCER

William W. Pharis, Rochester, N.Y., assignor to General Dynamics Corporation, Rochester, N.Y., a corporation of Delaware

Application July 19, 1957, Serial No. 673,035

7 Claims. (Cl. 179—18)

This invention relates to an intercept circuit for a tape announcer and, more particularly, to such an intercept circuit including improved means therein for operating the ring trip circuit of a connector having access thereto.

In a telephone exchange having an ultimate capacity of a given number of lines, a certain portion of these lines at any given time may be unassigned or unoccupied for some other reason. However, a calling subscriber, in error, may dial one of these unassigned or unoccupied lines. In order to inform the calling subscriber of the fact that he has dialed a wrong number with the least delay and at the least expense, it is customary to provide one or more intercept circuits having access to the unassigned or unoccupied terminals of the connectors of the exchange for connecting the calling subscriber with a tape announcer. In response to such a connection thereto, the tape announcer plays back a prerecorded message, such as, "You have dialed a wrong number. Please look up the number in the directory or call information."

As is well known in the art, a connector includes means therein responsive to a connection thereof to an idle called subscriber for applying ringing current and for operating ring trip means therein to remove ringing current in response to the called subscriber answering his phone. When the connector extends a connection to the tape announcer intercept circuit, described above, rather than to a line of a called subscriber, it is necessary to provide means for operating the ring trip means in the connector automatically, since no actual answering takes place.

As long as all the connectors of the exchange utilize identical ring trip circuits, no difficulty is experienced in providing means in the intercept circuit for tripping ringing. However, there are telephone exchanges wherein some of the connectors provide A.C. ringing to the called subscriber substations accessible therefrom, while the remaining connectors provide superimposed ringing to the called subscriber substations accessible therefrom. As will be brought out in greater detail below, in connectors providing A.C. ringing, the "hot" side of the ringing generator is usually connected to one of the talking conductors through the ring trip means, while in connectors providing superimposed ringing, the ground return of the ringing generator is usually connected to the other talking conductor through the ring trip means. Furthermore, there are some connectors in which the ring trip means is in circuit with both talking conductors.

It is therefore an object of this invention to provide a tape announcer intercept circuit which permits use with connectors having ring trip in either ground return or ringing side of the line, or both.

Figure 1:
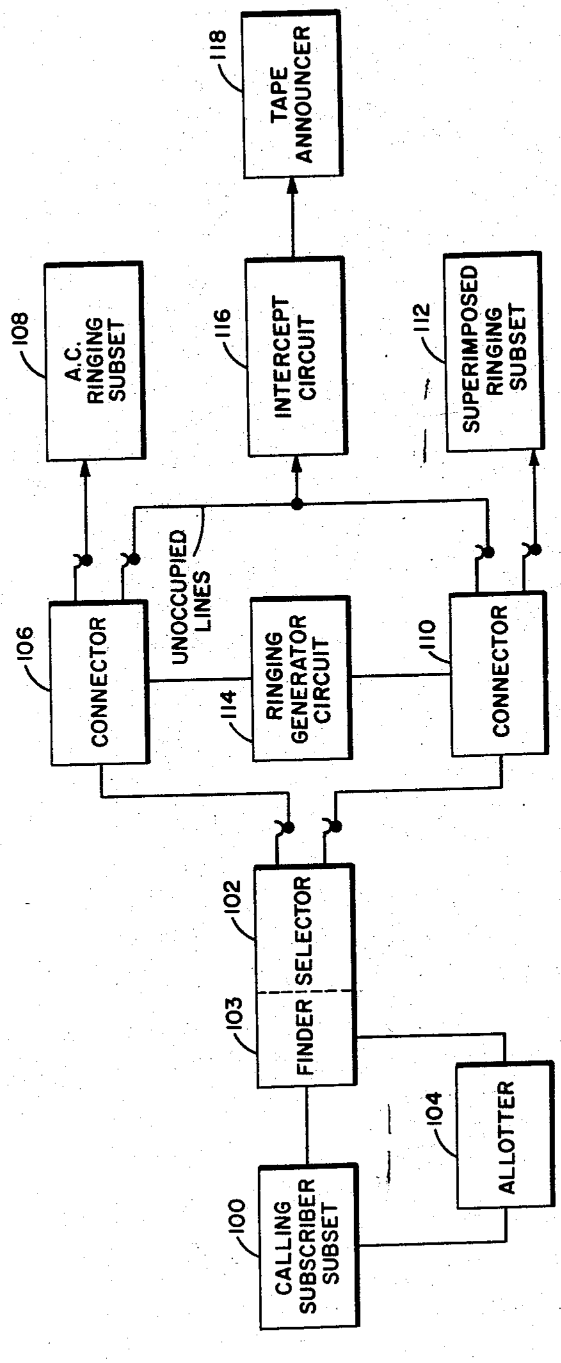
Figure 4:
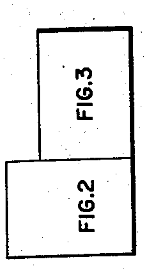
Figure 2:
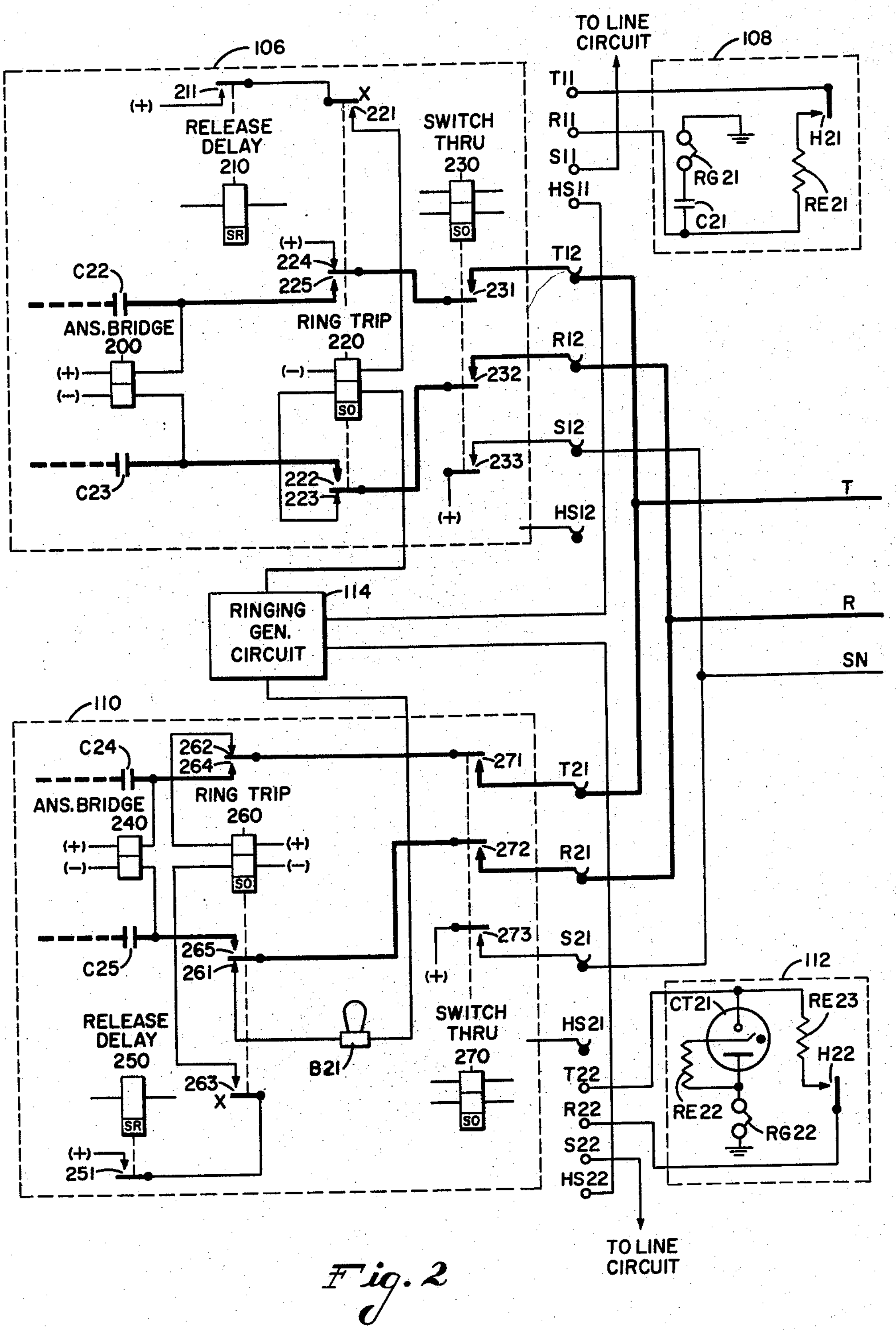
Figure 3:
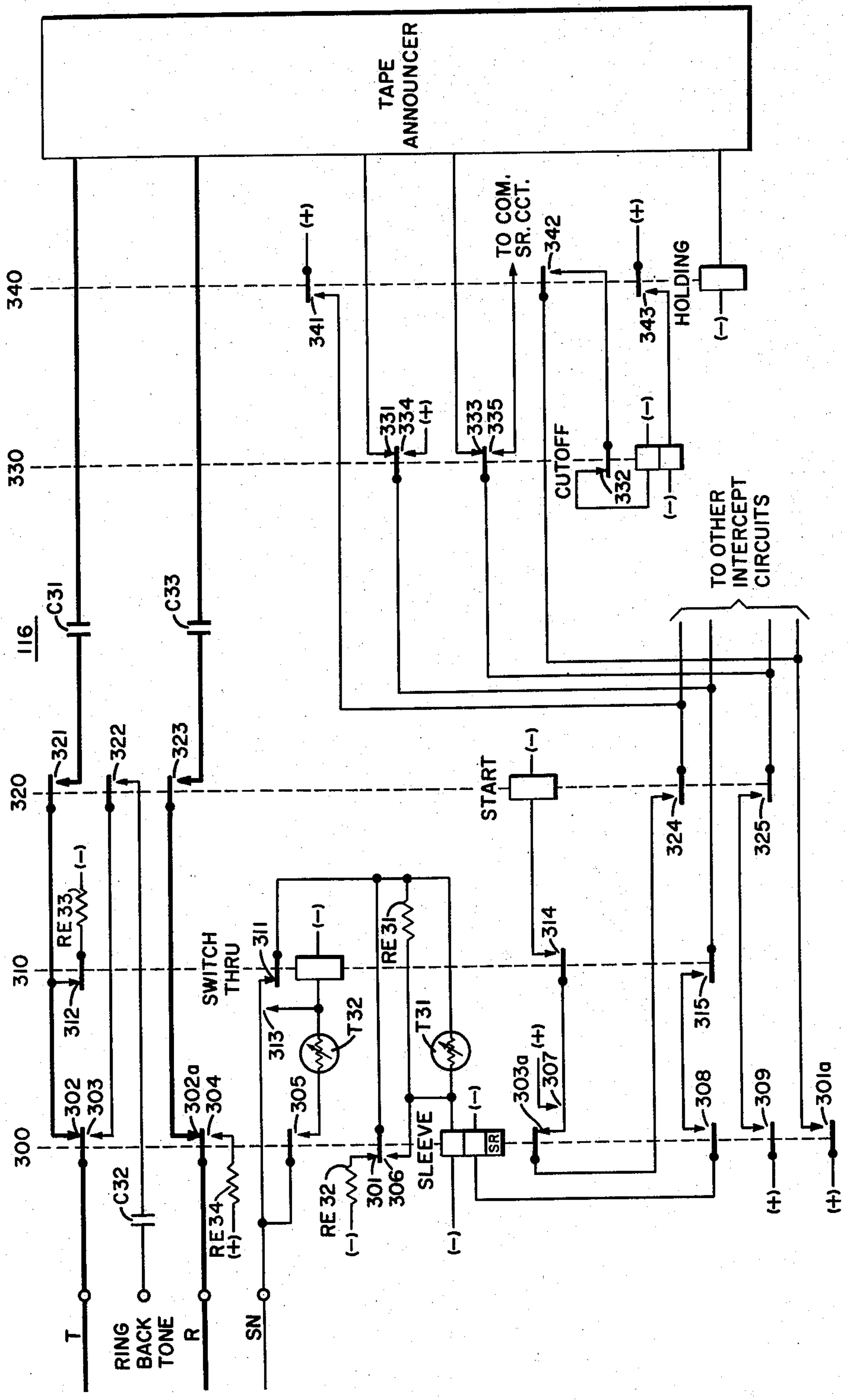

This and other objects and advantages of the present invention will become apparent from the following detailed description taken together with the accompanying drawing in which:

Fig. 1 is a block diagram of a telephone system employing the present invention, Figs. 2 and 3 taken together are a schematic and block diagram of the pertinent details of a preferred embodiment of the invention, and Fig. 4 shows the manner in which Figs. 2 and 3 are to be joined.

Referring now to Fig. 1, there is shown a block diagram of a telephone system utilizing the present invention. In response to the initiation of a call from calling subscriber subset 100, one of a group of selectors, such as selector 102 is connected to calling subscriber subset 100 by finder 103 which was preselected by allotter 104, all in a manner well known in the art. In response to the dialing of one or more particular predetermined digits by the calling subscriber, a connection is extended from calling subscriber subset 100 through selector 102 to effect the seizure of connector 106, while in response to the dialing by the calling subscriber of one or more different predetermined digits a connection is extended from calling subscriber subset 100 through selector 102 to effect the seizure of connector 110, again in a manner well known in the art. Connector 106 has access to a group of called subscriber lines which employ A.C. ringing subsets, while connector 110 has access to a group of called subscriber lines which employ superimposed ringing subsets.

Assuming first a connection has been extended from calling subscriber subset 100 to connector 106, the dialing of one or more additional digits by the calling subscriber will usually further extend the connection to one of the group of A.C. ringing subsets accessible from connector 106, such as A.C. ringing subset 108; whereupon connector 106 will apply ringing current from ringing generator circuit 114 to A.C. ringing subset 108. When the called subscriber answers, ringing will be tripped in connector 106 and a talking connection will be set up between calling subscriber subset 100 and A.C. ringing subset 108. However, should the additional digits dialed by the calling subscriber be such as to extend a connection to an unassigned or unoccupied line, rather than to one of the group of A.C. ringing subsets, intercept circuit 116 will be seized, which in turn will extend a connection to tape announcer 118. Tape announcer 118 will then play back a prerecorded message to the calling subscriber at calling subscriber subset 100.

Assuming now that a connection has been extended from calling subscriber subset 100 to connector 110, the dialing of additional digits by the calling subscriber will usually further extend a connection to one of a group of called subscriber lines which employ superimposed ringing subsets, such as superimposed ringing subset 112; whereupon connector 110 will connect ringing current from ringing generator circuit 114 to superimposed ringing subset 112. When the called subscriber answers superimposed ringing subset 112, ringing will be tripped in connector 110 and a talking connection will be extended between calling subscriber subset 100 and superimposed ringing subset 112. If the calling subscriber should dial additional digits which extend a connection to an unassigned or unoccupied line, the connection will be extended to tape announcer 118 through intercept circuit 116 in the same manner as described above in connection with connector 106.

Reference will now be had to Figs. 2 and 3, joined together as shown in Fig. 4, in order to describe the detailed structure of intercept circuit 116 and the pertinent structure of connectors 106 and 110 and subsets 108 and 112.

Consider first a connection extended to A.C. ringing subset 108 through connector 106. In response to the seizure of connector 106, release delay relay 210 is operated in a conventional manner over a circuit which is not shown, since it does not form part of the present invention. The operation of release delay relay 210 is effective in closing normally open contacts 211 thereof. In response to the dialing of the additional digits the wipers of the connector switch are brought into contact with terminals T11, R11, S11 and HS11 of a private or party line including A.C. ringing subset 108 thereon. A busy test is made by a circuit which is not shown but which is conventional, and if the line is idle switch-through relay 230 is operated over a circuit which is not shown but is conventional to effect the closure of normally open contacts 231, 232 and 233 thereof. The closure of contacts 233 apply a busy marking potential to the line circuit of A.C. ringing subset 108 over terminal S11. A ringing generator selection signal is applied from connector 106 to ringing generator circuit 114 over a conductor from terminal HS11. If A.C. ringing subset 108 is on a party line employing harmonic ringing and connector 106 is of the terminal per station type, the conductor from terminal HS11 to ringing generator circuit 114 is one of a plurality of such conductors connected from ringing generator circuit 114 to various HS terminals of the connector and is utilized to select that one of several ringing generators in ringing generator circuit 114 which supplies the proper frequency to effect the operation of A.C. ringing subset 108.

The ringing generators in ringing generator circuit 114 have one side thereof connected to either positive or negative battery and the other side thereof connected as shown through the bottom winding of ring trip relay 220, normally closed contacts 223 thereof, operated contacts 232 of switchthrough relay 230, the ring wiper of the connector switch, terminal R11, and capacitance C21 and ringer RG21 of A.C. ringing subset 108 to ground. No direct current, but only pure A.C. from the ringing generator, will flow through this circuit because of the presence of capacitance C21 which blocks direct current. Furthermore, any flux built up in ring trip relay 220 during the positive half cycles of the A.C. ringing current will be counteracted by the equal and opposite flux built up during the negative half cycles of the A.C. ringing current.

When the called subscriber answers A.C. ringing subset 108, thereby closing hookswitch H21, resistance RE21 of his telephone forms a bridge between terminals T11 and R11, thus completing a direct current path extending from positive or negative battery, through the ringing generator, the lower winding of ring trip relay 220, normally closed contacts 223 thereof, operated contacts 232, the ring wiper, terminal R11, resistance RG21, operated hookswitch H21, terminal T11, the tip wiper of the connector switch, operated contacts 231, normally closed contacts 224 of ring trip relay 220 to ground. The direct current flowing in this path causes the immediate operation of ring trip relay 220, which first closes preliminary normally open contacts 221 thereof to provide a holding circuit for ring trip relay 220 extending from ground through operated contacts 211, operated contacts 221, the upper winding of ring trip relay 220 to grounded battery, and then opens normally closed contacts 223 and 224 thereof and closes normally open contacts 222 and 225 thereof. The opening of normally closed contacts 223 and 224 of ring trip relay 220 breaks the connection between ringing generator circuit 114 and A.C. ringing subset 108 as well as the original operating path for ring trip relay 220. The closure of normally open contacts 222 and 225 of ring trip relay 220 completes a talking connection between the incoming talking conductors and A.C. ringing subset 108 as well as provides an operating path for answering bridge relay 200. This talking connection extends from one incoming talking conductor through capacitance C22, operated contacts 225 and 231, the tip wiper of the connector switch, terminal T11, operated hookswitch H21, resistance RG21 of the telephone of subset 108, terminal R11, operated contacts 232 and 222, capacitance C23 to the other incoming talking conductor. The operating path for answering bridge relay 200 extends from ground through the upper winding of answering bridge relay 200, operated contacts 225 and 231, the tip wiper of the connector switch, terminal T11, operated hookswitch H21, resistance RG21 of the telephone of subset 108, terminal R11, the ring wiper of the connector switch, operated contacts 232 and 222, the lower winding of answering bridge relay 200 to grounded battery. Answering bridge relay 200 is utilized in a conventionel manner to provide reverse battery supervision over a circuit which is not shown but is well known in the art.

Consider now a connection through connector 110 to superimposed ringing subset 112. In response to the seizure of connector 110 release delay relay 250 is operated over a circuit which is not shown but which is conventional in the art. The operation of release delay relay 250 effects the closure of normally open contacts 251 thereof. In response to the dialing of the additional digits to effect a connection of connector 110 with a party line including superimposed ringing subset 112 thereon, and after making a busy test by means of a circuit which is not shown, switchthrough relay 270 is operated by a circuit not shown but which is conventional in the art. The operation of switchthrough relay 270 is effective in closing normally open contacts 271, 272 and 273 thereof.

The connection of th e hunt sleeve wiper to terminal HS22 applies a marking signal over a conductor to ringing generator circuit 114 which selects a ringing generator in ringing generator 114 having one side thereof connected to negative battery. If the additional digits dialed into connector 110 had connected connector 110 with another subset (not shown) on the same line as subset 112, the conductor from the HS terminal of this other subset would have caused another ringing generator in ringing generator circuit 114 having positive battery connected to one side thereof to be selected.

In any case, the other side of the selected ringing generator is connected as shown from ringing generator circuit 114 through ballast lamp B21, normally closed contacts 261 of ring trip relay 260, operated contacts 272, terminal R22 to the cathode of cold cathode triode CT21. The anode of cold cathode triode CT21 is connected to a starter anode thereof through resistance RE22 and is also connected to ground through ringer RG22 of superimposed ringing subset 112. In the other subset on the same line as subset 112, the cold cathode triode thereof has its anode connected to the ring terminal and its cathode connected through the ringer thereof to ground, that is, the cathode and anode thereof are connected oppositely from those of cold cathode triode CT21.

The potential applied to the cathode of cold cathode triode CT21 is the superimposed negative battery on the ringing generator and the A.C. voltage of the ringing generator. Cold cathode triode 21 will conduct only when the cathode thereof is negative with respect to the anode thereof by at least a certain voltage. The magnitude of the ringing potential applied to the cathode of cold cathode triode CT21 is such that cold cathode triode 21 is permitted to conduct only in the region of the negative peaks of the A.C. component of the superimposed applied potential. Thus, the ringing current which goes through cold cathode triode CT21 to effect the operation of ringer RGT2 consists of a series of unidirectional pulses occurring once each cycle of the ringing generator frequency, that is, it has a direct current component, as opposed to the ringing current utilized in connection with A.C. ringing subset 108 which is pure alternating current.

It might be pointed out here that the cold cathode triode of the other subset on the same line as subset 112 will not conduct when the ringing generator is connected to negative battery, but only when the ringing generator is connected to positive battery, due to the fact that the connections to its cathode and anode are reversed relative to the connections of cold cathode triode CT21.

When the called subscriber at superimposed ringing subset 112 answers, thereby closing hookswitch H22, an operating circuit for ring trip relay 260 is completed. This circuit extends from negative battery through the ringing generator, ballast lamp B21, normally closed contacts 261, operated contacts 272, the ring wiper of connector 110, terminal R22, resistance RE23 of the telephone at subset 112, operated hookswitch H22, terminal T22, the tip wiper of connector 110, operated contacts 271, normally closed contacts 262, and the top winding of ring trip relay 260 to ground.

The operation of ring trip relay 260 provides a holding path therefor through operated contacts 251 and operated preliminary contacts 263, and transfers the talking terminals T22 and R22 from the previously described ringing circuit to the incoming talking conductors and answering bridge relay 240, in a manner similar to that previously described in connection with connector 106.

A comparison of connector 106 with connector 110 will show that these two connectors have substantially the same structure, differing only in that in connector 106 ring trip relay 220 is in series with the ringing generator while in connector 110 ring trip relay 260 is in series with the ground return, and that in connector 110 a ballast lamp is in series with the ringing generator while in connector 106 no ballast lamp is employed at all. The reason for incorporating the ring trip relay in the ground return path in connector 110, rather than placing it in series with the ringing generator, as in connector 106, is because, as previously explained, the ringing current in connector 110 consists of a series of unidirectional pulses having a direct current component. If the ring trip relay were included in series with the ringing generator in connector 110, there would be a great likelihood that this direct component of the ringing current pulses would build up enough flux in the ring trip relay to falsely operate it. Therefore, it is necessary to place the ring trip relay in the ground return. However, in order to limit the ringing current it is necessary to include a ballast lamp in series with the ringing generator.

In the case of connector 106, however, the ringing current, as previously explained, consists of pure alternating current. Therefore, the flux built up in the ring trip relay during positive half cycles of the alternating current are counteracted by the opposite and equal flux built up during the negative half cycles of the alternating current. Thus, in the case of connector 106, no possibility exists of falsely operating the ring trip relay, even though it is in series with the ringing current. Furthermore, the inherent resistance of the ring trip relay is sufficient to limit the ringing current, so that the ballast lamp and its attendant cost can be eliminated.

Consider now what happens when a calling subscriber dials an unoccupied or unassigned line of either connector 106 or connector 110.

As shown in Figs. 2 and 3, the unoccupied terminals T12, R12, and S12, respectively, of connector 106 and the unoccupied terminals T21, R21 and S21, respectively, of connector 110 are multipled to intercept circuit 116. The unoccupied terminals HS12 of connector 106 and HS21 of connector 110 are not utilized.

If a call to an unassigned line is extended through connector 106, switchthrough relay 230 thereof is operated and ground is applied through operated contacts 233 to the SN conductor of intercept circuit 116. In a similar manner, if a connection is extended to an unoccupied line through connector 110, switchthrough relay 270 thereof is operated, and ground is applied through operated contacts 273 to conductor SN of intercept circuit 116.

The application of ground to conductor SN from either connector 106 or 110, as the case may be, provides an energization path for sleeve relay 300, extending from ground on the SN conductor through normally closed contacts 311 of switchthrough relay 310, resistance RE31 in parallel with thermistor T31, the upper winding of sleeve relay 300 to grounded battery. The ground on conductor SN extending through normally closed contacts 311 is also applied through normally closed contacts 301 and resistance RE32 to grounded battery. Due to the presence of thermistor T31, the current through the upper winding of sleeve relay 300 builds up slowly, so that it does not operate until after a certain time delay.

Initially, resistance battery is present on the tip conductor T of intercept circuit 116, being extended thereto over a connection from grounded battery through resistance RE33 and normally closed contacts 312 and 302. If the connection to intercept circuit 116 comes through connector 106, the resistance battery present on tip conductor T is further extended through terminal T12, the wiper of connector 106, operated contacts 231, normally closed contacts 224 to ground, where it is without effect. However, if the connection to intercept circuit 116 is extended through connector 110, the resistance battery present on tip conductor T is extended through terminal T21, operated contacts 271, normally closed contacts 262, the upper winding of ring trip relay 260 to ground, resulting in the operation of ring trip relay 260. As previously described, the operation of ring trip relay 260 provides for the establishment of a holding circuit therefor extending from ground through operated contacts 251 and 263, and the lower winding of ring trip relay 260 to grounded battery.

The operation of ring trip relay 260 transfers the resistance battery on tip conductor T of intercept circuit 116 to the upper winding of answering bridge relay 240 through operated contacts 264. However, the current through the upper winding of answering bridge relay 240 is insufficient to effect the operation thereof.

After the time delay provided by thermistor T31, sleeve relay 300 operates. The operation of sleeve relay 300 causes the closure of normally open contacts 303, 304, 305, 306, 307, 308, 309 and 301*a* thereof, and the opening of normally closed contacts 302, 302*a*, 301 and 303*a* thereof.

The opening of contacts 302 removes the resistance battery, previously described, from the tip conductor T of intercept circuit 116. The closure of contacts 304, however, applies resistance ground to the ring conductor R of intercept circuit 116. If the connection to intercept circuit 116 comes from connector 110, the resistance ground present on ring conductor R is further extended through terminal R21, operated contacts 272, normally closed contacts 261, ballast lamp B21 to ringing generator circuit 114, where it is without effect. However, if the connection to intercept circuit 116 comes from connector 106, the resistance ground on ring conductor R is extended through terminal R12, operated contacts 232, normally closed contacts 223, the lower winding of ring trip relay 220, ringing generator circuit 114 to positive or negative battery, to thereby effect the operation of ring trip relay 220. The operation of ring trip relay 220 establishes a previously described holding circuit therefor extending from ground through operated contacts 211 and 221 and the upper winding of ring trip relay 220 to grounded battery. The operation of ring trip relay 220 transfers the resistance ground on the ring conductor R of intercept circuit 116 from the lower winding of ring trip relay 220 to the lower winding of answering bridge relay 200 through operated contacts 222. However, the current through the lower winding of answering bridge relay 200 is insufficient to effect the operation thereof.

The reason for applying resistance battery to the tip conductor T and resistance ground to the ring conductor R of intercept circuit 116 sequentially, rather than simultaneously, is to prevent the operation of either answering bridge relay 200 or 240, as the case may be, after the ring trip relay has been operated.

Since the remaining portions of intercept circuit 116 are conventional and well known in the art, they will only be described briefly herein in order to complete the disclosure of the present invention.

The closure of contacts 305 provides an operating circuit for switchthrough relay 310 through thermistor T32. Switchthrough relay 310 therefore does not operate until after a certain delay. The closure of contacts 306 provides a shunt about thermistor T31, applying ground from conductor SN directly to the upper winding of sleeve relay 300 through normally closed contacts 311.

After the time delay provided by thermistor T32, switchthrough relay 310 operates to open normally closed contacts 312 and 311 thereof and to close normally open contacts 313, 314 and 315 thereof.

The opening of contacts 312 prevents the reapplication of resistance battery to the tip conductor T. The opening of contacts 311 removes operating ground from the upper winding of sleeve relay 300. However, sleeve relay 300 does not immediately release due to its slow release characteristics. The closure of contacts 313 shunts out thermistor T32 from the operating path of switchthrough relay 310. The closure of contacts 314 provides an operating path for start relay 320 through operated contacts 307 and 314. The closure of contacts 315 prepares a holding path for sleeve relay 300 from conductor TB of tape announcer 118 through normally closed contacts 331 and operated contacts 315 and 308, and the lower winding of sleeve relay 300 to grounded battery. Assuming tape announcer 118 to be idle at the moment, ground will be present on conductor TB, so that sleeve relay is held operated.

The operation of start relay 320 over its previously described operating path effects the closure of normally open contacts 321, 322, 323, 324 and 325 thereof.

The closure of contacts 321 prepares a talking path to tape announcer 118 from tip conductor T through capacitor C31. The closure of contacts 322 applies ringback tone to tip conductor T through capacitor C32 and operated contacts 322 and 303. The closure of contacts 323 prepares a talking path from ring conductor R to tape announcer 118 through capacitance C33. The closure of contacts 324 prepare holding path for start relay 320. The closure of contacts 325 applies a start ground to tape announcer 118 over a connection extending from ground through operated contacts 309 and 325, normally closed contacts 333 to conductor ST of tape announcer 118.

In response to the application of the start ground thereto, tape announcer 118 initiates a cycle of operation, playing back the prerecorded message therein. As soon as a cycle begins, ground is removed from the TB conductor and applied to the SL conductor of tape announcer 118. The removal of ground from the TB conductor, deenergizes the holding circuit for the lower winding of sleeve relay 300, but this relay does not release immediately due to its slow release characteristics.

Holding relay 340 operates in response to the application of ground thereto from the sleeve conductor of tape announcer 118, thereby closing normally open contacts 341, 342 and 343 thereof.

The closure of contacts 342 causes the energization of the upper winding of differentially wound cutoff relay 330 over a connection extending from ground through operated contacts 301*a* and 342, normally closed contacts 332, the upper winding of cutoff relay 330 to grounded battery. The closure of contacts 343 energizes the lower winding of differentially wound cutoff relay 330 over a connection extending from ground through operated contacts 343 and the lower winding of cutoff relay 330 to grounded battery. Since both the upper and lower windings of differentially wound cutoff relay 330 are energized, cutoff relay 330 does not operate at this time.

After a period determined by its slow release characteristics, sleeve relay 300 restores. The reclosing of contacts 302 and 302*a* complete the previously prepared talking connection between tape announcer 118 and the calling subscriber. The opening of contacts 307 breaks the previously described operating path for start relay 320, but start relay 320 remains operated because ground is applied thereto through operated contacts 341 and 324, normally closed contacts 303*a*, operated contacts 314, the winding of start relay 320 to grounded battery. The opening of normally open contacts 301*a* breaks the previously described energizing path for the upper winding of cutoff relay 330, permitting cutoff relay 330 to operate over its still energized lower winding. The operation of cutoff relay 330 opens normally closed contacts 331, 332 and 333 thereof and closes normally open contacts 334 and 335 thereof.

As will become clearer later, the purpose of cutoff relay 332 is to prevent other intercept circuits having access to tape announcer 118 from being connected thereto during the interval that tape announcer 118 is in the middle of a playback cycle.

At the end of the playback cycle of tape announcer 118, ground is removed from conductor SL of tape announcer 118, deenergizing holding relay 340, so that this relay restores. The restoration of holding relay 340 opens contacts 343 thereof, breaking the energizing path for cutoff relay 330, which also restores. The opening of contacts 341 break the energizing path for start relay 320, which then releases. Switchthrough relay 310 remains operated, however, until the calling subscriber hangs up, thereby preventing the reoperation of sleeve relay 300. Thus, the calling subscriber hears the prerecorded message of tape announcer 118 during only one complete playback cycle thereof.

Assume now that when switchthrough relay 310 of intercept circuit 116 operates, tape announcer 118 is in the middle of a playback cycle to some other intercept circuit having access thereto. Under this condition, as previously described, cutoff relay 330 is operated. Therefore, in response to the operation of switchthrough relay 310, ground is applied to the lower winding of sleeve relay 300 over a connection extending from ground through operated contacts 334, 315 and 308, and the lower winding of sleeve relay 300 to grounded battery. Therefore sleeve relay 300 remains operated. Furthermore, ground is not applied to the start conductor of tape announcer 118 through operated contacts 309, as previously described, since contacts 333 are now open, but instead is applied to the start conductor of the common supervisory circuit through operated contacts 335. If this ground remains for longer than a given period, which is more than sufficient for a playback cycle, it causes the operation of an alarm in the common supervisory circuit.

As previously described, at the end of a playback cycle of tape announcer 118, holding relay 340 and in turn cutoff relay 330 are restored.

Tape announcer 118 is now in an idle condition, and is seized by intercept circuit 116, as well as by any other intercept circuits whose switchthrough relays operated during the previous playback cycle, in the manner described above.

Although a preferred embodiment of this invention has been described, it is not intended that the invention be restricted thereto, but that it be limited only by the scope of the appended claims.

I claim:

1. In a telephone system, a first connector having first and second outgoing conductors and current-operated ring trip means in circuit with said first outgoing conductor, a second connector having first and second outgoing conductors and current-operated ring trip means in circuit with said second outgoing conductor, automatic means seizable by said first or second connector and having first and second incoming conductors which are connected respectively to said first and second outgoing conductors of the seizing connector, and said automatic means having potential applying means for successively applying a potential to each conductor of said first and second incoming conductors to effect the operation of said ring trip means in response to the seizure of said automatic means by said first or second connector regardless of the conductor with which said ring trip means is associated.

2. The combination defined in claim 1, wherein said potential applying means comprises means for applying a first potential to solely one conductor of said first and second incoming conductors and then a time delay after seizure of said automatic means for simultaneously removing said first potential from said one conductor of said first and second incoming conductors and applying a second potential to solely the other conductor of said first and second incoming conductors.

3. The combination defined in claim 2, wherein said first potential has a given polarity and said second potential has a polarity opposite to said given polarity.

4. The combination defined in claim 2, wherein said potential-applying means includes a relay having a winding and at least first and second normally closed contacts and normally open contacts, said first normally closed contacts connecting a first portion of said first conductor of said incoming first and second conductors to a second portion thereof, said second normally closed contacts connecting a first portion of said second conductor of said incoming first and second conductors to a second portion thereof, means including a first resistance for applying said first potential to said second portion of said first conductor, a second resistance for applying said second potential to said first portion of said second conductor through said normally open contacts, delay means in series with said winding, and means responsive to the seizure of said automatic means for applying an energizing signal to said winding through said delay means to effect the operation of said relay after a time delay.

5. The combination defined in claim 4, wherein said delay means is a thermistor.

6. The combination defined in claim 4, wherein said first potential has a given polarity and said second potential has a polarity opposite to said given polarity.

7. The combination defined in claim 4, wherein said relay includes second normally open contacts, and means for applying ring-back tone to said first portion of said first conductor through said second normally open contacts when said relay is operated.

References Cited in the file of this patent

UNITED STATES PATENTS

| | | |
|---|---|---|
| 2,208,924 | Davidson | July 23, 1940 |
| 2,209,513 | Davidson | July 30, 1940 |